United States Patent

Numata et al.

[11] 3,955,892
[45] May 11, 1976

[54] DEVICE FOR INDICATING EXPOSURE INFORMATION IN THE VIEWFINDER OF A CAMERA

[75] Inventors: Saburo Numata, Urawa; Iwao Sagara, Higashikurume; Hirohisa Shishikura, Kodaira, all of Japan

[73] Assignees: Fuji Photo Optical Co., Ltd., Omiya; Oki Electric Industry Company, Ltd., Tokyo, both of Japan

[22] Filed: July 29, 1974

[21] Appl. No.: 492,840

[30] Foreign Application Priority Data

July 28, 1973 Japan.............................. 48-85168

[52] U.S. Cl.............................. 356/219; 356/226; 356/227; 354/230; 354/60 L
[51] Int. Cl.² .................... G01J 1/42; G03B 7/08
[58] Field of Search .......... 356/226, 227, 219, 230; 354/53, 23 D, 60 L; 315/149, 158

[56] References Cited

UNITED STATES PATENTS

| | | | |
|---|---|---|---|
| 3,261,273 | 7/1966 | Broschke | 356/219 |
| 3,416,032 | 12/1968 | Jahns et al. | 315/149 |
| 3,473,084 | 10/1969 | Dodge | 315/149 |
| 3,843,265 | 10/1975 | Egli et al. | 356/226 |

Primary Examiner—John K. Corbin
Assistant Examiner—Conrad Clark
Attorney, Agent, or Firm—Donald P. Gillette; Harold L. Stults

[57] ABSTRACT

Light emitting elements such as light emitting diodes provided in the viewfinder of a camera are connected with a light measuring circuit including a photodetector through an A-D converter, a decoder and a gate circuit so that the light emitting elements may indicate exposure information in a digital form in accordance with the output of the light measuring circuit. An oscillator is connected with the A-D converter and the gate circuit for giving sampling pulses to the A-D converter and clock pulses to the gate circuit. Between the oscillator and the gate circuit is provided a duty modulator to change the duty cycle of the square wave transmitted from the oscillator to the gate circuit. The duty modulator is connected with the light measuring circuit or the A-D converter so as to control the duty cycle of the square wave in accordance with the output from the light measuring circuit. the brightness of the light emitting elements in the viewfinder is controlled so as to be proportional to the brightness of the image viewed through the viewfinder.

7 Claims, 4 Drawing Figures

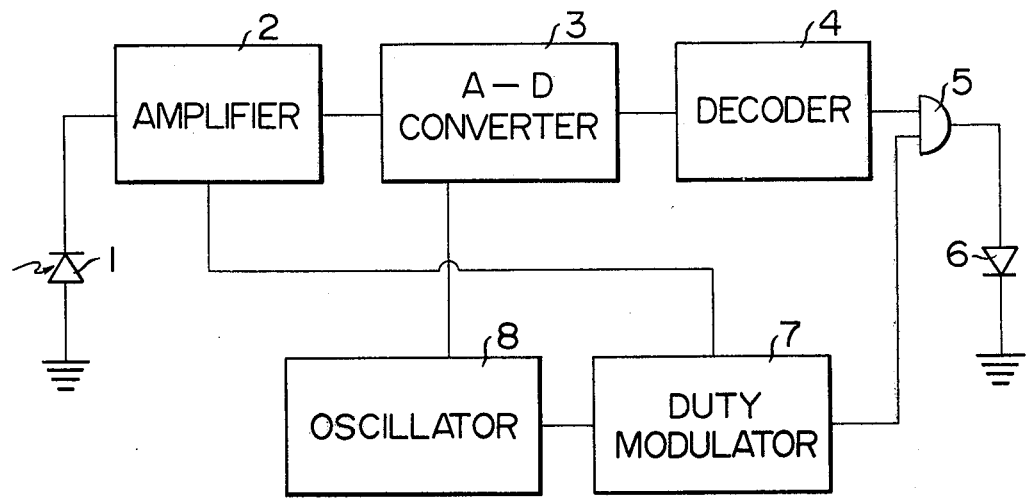
FIG. 1
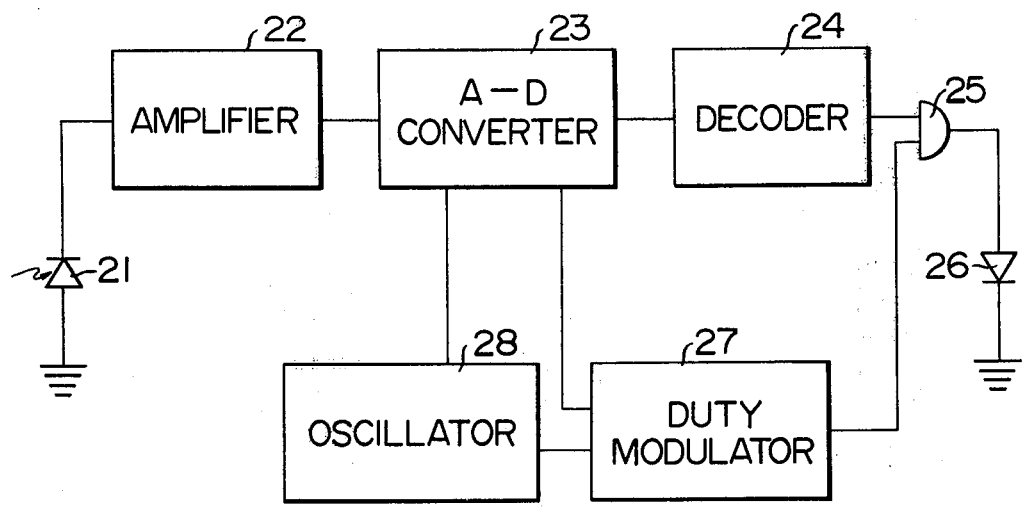
FIG. 2
FIG. 3A
FIG. 3B
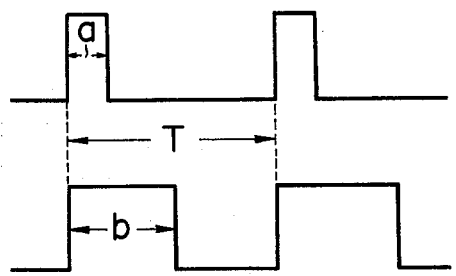

DEVICE FOR INDICATING EXPOSURE INFORMATION IN THE VIEWFINDER OF A CAMERA

BACKGROUND OF THE INVENTION

1. Field of the Invention

This invention relates to a device for indicating exposure information in the viewfinder of a camera, and more particularly to a device for indicating various kinds of information in the viewfinder of a photographic camera by use of electrically operated light emitting elements.

2. Description of the Prior Art

In the conventional photographic cameras, it has been known to indicate various kinds of information such as the brightness of the object to be photographed, the shutter speed or diaphragm hole size automatically controlled by exposure controlling means, the condition of the power voltage and so forth in the visual field of the viewfinder so that the photographer can see such information together with the image viewed through the viewfinder. As for the light emitting elements, electric lamps have generally been used. Recently, it has been proposed to use various kinds of solid-state light emitting elements such as light emitting diodes and electro-luminescent materials.

The above described indicating device using solid-state light emitting elements suffers from the defect that the light emitting elements sometimes become hard to see when the brightness level of the image viewed through the viewfinder is much higher than that of the light emitting elements. In order to eliminate such a defect, it has been known to use a separate light measuring circuit in addition to the light measuring circuit connected with a circuit for selectively operating the light emitting elements to control the brightness of the light emitting elements by changing the operating voltage of the elements in accordance with the brightness of the object to be photographed.

The above described means for controlling the brightness of the light emitting elements is disadvantageous in that two light measuring means must be separately provided in the camera. Another disadvantage inherent in the above described indicating device with the brightness controlling means is that, when light emitting diodes as of GaAsP are used, the brightness of the light emitting diodes cannot be changed over a wide range by changing the operating voltage.

Under the above described conventional disposition of the information indicating means in a camera, there is a demand for a device for indicating information in the viewfinder of a camera in which only one light measuring circuit is used and the brightness of the light emitting elements in the viewfinder is varied over a wide range in accordance with the brightness of the image viewed through the viewfinder.

SUMMARY OF THE INVENTION

In the light of the foregoing observations and description, it is an object of the present invention to provide a device for indicating information in the viewfinder of the camera which employs only one light measuring circuit.

Another object of the present invention is to provide a device for indicating information in the viewfinder of a camera by use of light emitting elements in which the brightness of the elements is varied over a wide range in accordance with the brightness of the object to be photographed.

Still another object of the present invention is to provide a device for indicating information in the viewfinder of a camera by use of light emitting elements in which the power consumption is very low.

The information indicating device in accordance with the present invention comprises a light measuring circuit including a photodetector to receive light from the object to be photographed and generate an output indicating the amount of light received thereby, an indicating circuit including light emitting elements for indicating information in accordance with the output from the light measuring circuit, and a brightness controlling circuit connected with the light measuring circuit and the indicating circuit for controlling the brightness of the light emitting elements in accordance with the output from the light measuring circuit. The brightness controlling circuit comprises a duty cycle modulator connected with an oscillator and the light emitting indicating circuit for varying the width of the pulses from the oscillator in accordance with the output from the light measuring circuit. The pulses the width of which is controlled by the duty modulator are used to energize the light emitting elements.

In one embodiment of the invention, the duty cycle modulator in the brightness controlling circuit is connected with an amplifier in the light measuring circuit to amplify the output of the photodetector. In another embodiment of the invention, the duty cycle modulator is connected with an A-D converter connected with the amplifier to convert the analogue output from the amplifier to a digital output. In both embodiments, the duty cycle modulator controls the width of the pulses from the oscillator so as to energize the light emitting elements in the indicating means in accordance with the signal indicative of the brightness of the object to be photographed that is viewed through the viewfinder of the camera.

The above described means for controlling the brightness of the light emitting elements using a duty cycle modulator is advantageous in that the power consumption is low in comparison with the conventional means for controlling the brightness of lignt emitting elements by controlling the operating voltage or current supplied to the elements.

BRIEF DESCRIPTION OF THE DRAWING

FIG. 1 is a block diagram illustrating an embodiment of the device for indicating exposure information in accordance with the present invention, FIG. 2 is a block diagram illustrating another embodiment of the device for indicating exposure information in accordance with the present invention, and FIGS. 3A and 3B illustrate the pulses transmitted to the light emitting elements, the width of these pulses being controlled by the duty modulator.

DESCRIPTION OF THE PREFERRED EMBODIMENTS

A preferred embodiment of the present invention will now be described in detail referring to FIG. 1. A photodetector 1 such as a cadmium sulfide element or a silicon blue cell receives light from the object to be photographed and generates an analogue output in accordance with the amount of light received thereby which corresponds to the brightness of the object. The analogue output of the photodetector 1 is amplified by an amplifier 2 connected therewith. an A-D converter 3 is connected with the amplifier 2 to convert the analogue output therefrom to a digital output. The digital output of the A-D converter 3 is transmitted to a gate circuit 5 through a decoder 4. The gate circuit 5 is connected with light emitting elements 6 to selectively energize the elements 6. Although the light emitting elements 6 are illustrated by a representative single element 6 in FIG. 1, a number of elements 6 are provided to make a digital indication by selectively energizing several of the elements. The decoder 4 operates to selectively energize the light emitting elements 6 in accordance with the digital output from the A-D converter 3 by operating the gate circuit 5. An oscillator 8 is connected with the A-D converter 3 and the gate circuit 5 to give pulses or a square wave to the A-D converter 3 and the gate circuit 5. Between the oscillator 8 and the gate circuit 5 is provided a duty cycle modulator 7. In this embodiment, the duty cycle modulator 7 is connected with the amplifier 2 so that the duty cycle modulator 7 may control the duty cycle or the width of the square wave transmitted from the oscillator 8 to the gate circuit 5 in accordance with the output of the amplifier 2.

The light emitting elements 6 such as light emitting diodes are arranged in the shape of numerals so that the indication may be made in a digital form showing, for instance, shutter speeds such as 1000, 500, 250, 125, 60, 30, 15, 8, 4, 2 and 1. Such an indication can be made by use of a conventionally known type of light emitting device consisting of seven segments arranged in the form of the numeral "8". The seven segments constitute one digital numeral and four of these numerals are provided for indicating the above described various shutter speeds. The decoder 4 operates to selectively energize the light emitting segments to indicate a shutter speed which is that obtained by the shutter in the camera actually controlled by a shutter conrolling means connected with the light measuring circuit.

The light emitting elements 6 are energized only when the gate circuit 5 receives pulses from the oscillator 8 through the duty cycle modulator 7 together with digital controlling signals from the decoder 4. Since the current supplied to the light emitting elements 6 is in the form of a square wave, the light emitting elements 6 are intermittently energized at the frequency of the square wave and accordingly the brightness of the light emitting elements 6 seen by the photographer is in proportion to the width of the pulses or duty cycle of the square wave.

Referring to FIGS. 3A and 3B, when the width of pulses or duty cycle of the square wave is increased from a (FIG. 3A) to b (FIG. 3B), the time for which the light emitting elements 6 are energized is prolonged and accordingly their brightness increases. The variation in the intensity of the light emitting elements as seen is referred to as brightness in this specification.

In this invention, the width of pulses or duty cycle of the square wave supplied to the gate circuit 5 and accordingly to the light emitting elements 6 is controlled in accordance with the output from the light measuring circuit so that the width of pulses may be increased when the output current from the light measuring circuit increases as the amount of light received by the photodetector 1 increases. Consequently, the brightness of the light emitting elements 6 increases as the brightness of the object to be photographed increases.

Therefore, the photographer can see the digital indication made by the light emitting elements clearly even when the brightness of the image viewed through the viewfinder increases. Further, even when the image viewed through the viewfinder darkens, the emitting elements do not disturb the observation of the image since the brightness of the elements is decreased as the image darkens.

In the above described first embodiment of the present invention, the brightness of the light emitting elements is continuously varied by the duty cycle modulator 7 which is connected with the amplifier 2 and operated by the analogue output therefrom. The brightness of the light emitting elements may be discretely changed by the duty cycle modulator if the duty modulator is operated by a digital input.

FIG. 2 illustrates another embodiment of the invention in which the brightness of the light emitting elements is discretely changed. In this second embodiment, similarly to the above described first embodiment, a photodetector 21 which receives light from the object to be photographed is connected with an amplifier 22 which amplifies the analogue output from the photodetector 21 and generates an amplified analogue output. The amplified analogue output from the amplifier 22 is put into an A-D converter 23 which converts the analogue output from the amplifier 22 to a digital output. The digital output from the A-D converter 23 is transmitted to a gate circuit 25 through a decoder 24 to operate the gate circuit 25. The gate circuit 25 is connected with light emitting elements 26 such as light emitting diodes and selectively energizes the light emitting elements 26 to make a digital indication of exposure information corresponding to the output from the photodetector 21. An oscillator 28 is connected with the A-D converter 23 and the gate circuit 25 to give sampling pulses to the A-D converter 23 and clock pulses to the gate circuit 25. Between the oscillator 28 and the gate circuit 25 is provided a duty cycle modulator 27 for changing the pulse width or duty cycle of the square wave transmitted from the oscillator 28 to the gate circuit 25. The duty cycle modulator 27 in the second embodiment is connected with the A-D converter 23 so that the duty cycle modulator 27 may be operated by the digital output from the A-D converter 23. The digital output from the A-D converter 23 corresponds to the brightness of the object to be photographed, and accordingly, the duty cycle of the square wave put into the gate circuit 25 is controlled in accordance with the brightness of the object similarly to the first embodiment.

We claim:

1. In a camera comprising a viewfinder in which an image of an object to be photographed is presented, means comprising:
   a light measuring circuit including a photodetector which receives light from the object to be photographed and generates an output voltage having an amplitude corresponding to the brightness of the object;
   a light emitting indicating means connected to said light measuring circuit for indicating exposure information in accordance with the output voltage therefrom, said indicating means being visible in said viewfinder along with said image;
   a rectangular wave generating means connected to said light emitting indicating means for supplying to the latter a light emitting signal; and a duty cycle modulating means connected between the rectangular wave generating means and the light emitting indicating means for controlling the average intensity of light from the latter duty cycle of the rectangular wave, said duty cycle modulating means also being connected to the light measuring circuit to receive output information from the light measuring circuit to modulate the duty cycle of the rectangular wave in accordance with the amplitude of the output voltage from the light measuring circuit, whereby the brightness of the light emitting indicating means is controlled in accordance with the brightness of the object.

2. The invention as defined in claim 1 wherein said light measuring circuit includes an amplifier for amplifying the output of the photodetector and an A-D converter for converting the analogue output from the amplifier to a digital signal, and said rectangular wave generating means is connected to the A-D converter to supply sampling pulses to the A-D converter, and said light emitting indicating means includes a number of light emitting elements located relative to each other to provide numerical information when selectively energized.

3. The invention as defined in claim 2 wherein said duty cycle modulating means is connected to the amplifier and continuously controls the duty cycle of the rectangular wave in accordance with the amplitude of the analogue output voltage from the amplifier.

4. The invention as defined in claim 2 wherein said duty cycle modulating means is connected to the A-D converter and discretely controls the duty cycle of the rectangular wave in accordance with the digital output from the A-D converter.

5. The invention as defined in claim 2 wherein said light emitting indicating means comprises a decoder connected with said A-D converter and a gate circuit connected between the decoder and the light emitting elements for selectively energizing the light emitting elements, and said duty cycle modulating means is connected to the gate circuit.

6. The invention as defined in claim 5 wherein said duty cycle modulating means is connected between the gate circuit and said amplifier.

7. The invention as defined in claim 5 wherein said duty cycle modulating means is connected between the gate circuit and said A-D converter.

* * * * *